US010583466B2

(12) United States Patent
Hiraide et al.

(10) Patent No.: US 10,583,466 B2
(45) Date of Patent: Mar. 10, 2020

(54) THREE-DIMENSIONAL TRANSPORT TYPE BENCH TOP CLEANING DEVICE

(71) Applicant: HIRAIDE PRECISION CO., LTD., Okaya-shi, Nagano (JP)

(72) Inventors: Masahiko Hiraide, Okaya (JP); Hideo Takei, Okaya (JP); Kazutaka Fujimori, Okaya (JP); Tatsumi Yoneda, Okaya (JP)

(73) Assignee: Hiraide Precision Co., Ltd., Nagano (JP)

( * ) Notice: Subject to any disclaimer, the term of this patent is extended or adjusted under 35 U.S.C. 154(b) by 190 days.

(21) Appl. No.: 15/565,048

(22) PCT Filed: Sep. 11, 2015

(86) PCT No.: PCT/JP2015/075908
§ 371 (c)(1),
(2) Date: Oct. 6, 2017

(87) PCT Pub. No.: WO2017/042976
PCT Pub. Date: Mar. 16, 2017

(65) Prior Publication Data
US 2018/0099315 A1    Apr. 12, 2018

(51) Int. Cl.
*B08B 3/12*    (2006.01)
*B08B 3/04*    (2006.01)
(Continued)

(52) U.S. Cl.
CPC ............ *B08B 3/123* (2013.01); *B08B 3/041* (2013.01); *B08B 3/045* (2013.01); *B65G 17/16* (2013.01);
(Continued)

(58) Field of Classification Search
CPC combination set(s) only.
See application file for complete search history.

(56) References Cited

U.S. PATENT DOCUMENTS

| 3,033,710 A * | 5/1962 | Hightower | ............. B08B 3/123 134/1 |
| 5,114,494 A * | 5/1992 | Remec | .................... B08B 3/123 134/1 |
| 2004/0086364 A1* | 5/2004 | Watanabe | ............. B25J 9/0084 414/416.01 |

FOREIGN PATENT DOCUMENTS

| JP | 58-41522 A | 3/1983 |
| JP | 6-72681 U | 10/1994 |

(Continued)

OTHER PUBLICATIONS

International Search Report (PCT/ISA/210) dated Dec. 1, 2015, by the Japanese Patent Office as the International Searching Authority for International Application No. PCT/JP2015/075908.

(Continued)

*Primary Examiner* — Cristi J Tate-Sims
(74) *Attorney, Agent, or Firm* — Buchanan Ingersoll & Rooney PC

(57) ABSTRACT

A cleaning device is provided with a three-dimensional circulation route for circulating workpiece holding tools that hold a workpiece, and this three-dimensional circulation route is formed by an endless conveyor chain bendable in various directions being disposed within a rectangular parallelepiped space following along the upper and lower sides thereof. The conveyor chain circulates from an upper side horizontal transport path portion via a falling side transport path portion, a lower side horizontal transport path portion, and a rising side transport path portion, and the workpiece held in the workpiece holding tools is treated by ultrasonic cleaning, shower cleaning, steam cleaning, drying and the like. Thus, it is possible to suitably dispose a workpiece transport route in a limited rectangular parallelepiped space, and carry out cleaning operations for the workpiece efficiently.

12 Claims, 5 Drawing Sheets

(51) Int. Cl.
*B65G 17/16* (2006.01)
*B65G 17/36* (2006.01)
*B65G 17/38* (2006.01)
*B65G 23/04* (2006.01)
*B65G 15/58* (2006.01)
*B65G 49/02* (2006.01)

(52) U.S. Cl.
CPC ............ *B65G 17/36* (2013.01); *B65G 17/385* (2013.01); *B65G 23/04* (2013.01); *B65G 15/58* (2013.01); *B65G 49/025* (2013.01); *B65G 2201/02* (2013.01)

(56) References Cited

FOREIGN PATENT DOCUMENTS

| | | |
|---|---|---|
| JP | 7-021167 U | 4/1995 |
| JP | 8-89913 A | 4/1996 |
| JP | 8-182973 A | 7/1996 |
| JP | 9-299859 A | 11/1997 |
| JP | 10-305908 A | 11/1998 |
| JP | 2000-070880 A | 3/2000 |

OTHER PUBLICATIONS

Written Opinion (PCT/ISA/237) dated Dec. 1, 2015, by the Japanese Patent Office as the International Searching Authority for International Application No. PCT/JP2015/075908.

\* cited by examiner

THREE-DIMENSIONAL TRANSPORT TYPE BENCH TOP CLEANING DEVICE

TECHNICAL FIELD

The present invention relates to a three-dimensional transport type bench top cleaning device used for cleaning metal fittings such as bolts or nuts, constituent components of medical equipment, and other small sized workpieces comprising various materials.

BACKGROUND ART

As layouts for a cleaning device, known are: a transport mode by which workpieces are transported via a cleaning tank, a rinsing tank, etc., arrayed along a linear transport path; a horizontal circulation mode by which workpieces are transported along a circular or ellipsoidal horizontal circulation route and cleaning, etc., is performed (Patent Document 1); a vertical circulation mode by which workpieces are transported along a circular or ellipsoidal vertical circulation route and cleaning, etc., is performed (Patent Document 2); a mixed mode by which workpieces are raised and lowered and turned horizontally (Patent Document 3); and a mixed mode by which workpieces are moved laterally and turned vertically.

PRIOR ART DOCUMENTS

Patent Documents

Patent Document 1: JP H08-182973 A
Patent Document 2: JP H09-299859 A
Patent Document 3: JPU H07-21167 A

SUMMARY OF THE INVENTION

Problems to be Solved by the Invention

A small-sized cleaning device has a limited disposition space, so it is necessary to increase the usage efficiency of the disposition space, and to perform the cleaning operation for the workpiece efficiently. Especially in the case of a bench top cleaning device, in many cases, the usable disposition space is limited to a rectangular parallelepiped space of a prescribed width, depth, and height that can be secured on the bench top. For example, it is necessary to incorporate within a rectangular parallelepiped space limited to approximately a width of 1-2 m, a depth of 1-2 m, and a height of 1-2 m: a plurality of treatment tanks for cleaning, a transport path for transporting a workpiece to these treatment tanks, and a workpiece transport mechanism for transporting the workpiece along the transport path.

Taking such points into consideration, an object of the present invention is to realize a three-dimensional transport type bench top cleaning device with a workpiece transport route suitably disposed in a limited rectangular parallelepiped space, the device being made so that a cleaning operation of a workpiece can be performed efficiently via a plurality of treatment tanks disposed along the workpiece transport route.

Means of Solving the Problems

To solve the abovementioned problems, the three-dimensional transport type bench top cleaning device of the present invention is characterized by having:

a three-dimensional circulation route that defines a transport route of a workpiece to be cleaned;
a workpiece transport mechanism that transports the workpiece along the three-dimensional circulation route;
a workpiece input part that inputs the workpiece to the three-dimensional circulation route;
a workpiece carryout part that carries out the workpiece from the three-dimensional circulation route; and
a plurality of workpiece treatment parts disposed at different positions between the workpiece input part and the workpiece carryout part in the three-dimensional circulation route,
where the directions of the sides of a rectangular parallelepiped of a prescribed size are x, y, and z, the three-dimensional circulation route being provided with:
a first transport path portion that extends along one first side extending in the x direction of the rectangular parallelepiped;
a second transport path portion that extends along a second side extending in the y direction from one end of the first side;
a third transport path portion that extends along a third side extending in the z direction from an end of the second side;
a fourth transport path portion that extends along a fourth side extending in the y direction from an end of the third side;
a fifth transport path portion that extends along a fifth side extending in the x direction from an end of the fourth side;
a sixth transport path portion that extends along a sixth side extending in the y direction from an end of the fifth side;
a seventh transport path portion that extends along a seventh side extending in the z direction from an end of the sixth side; and
an eighth transport path portion that extends along an eighth side extending in the y direction from an end of the seventh side,
the workpiece transport mechanism being provided with:
a flexible endless member that defines the three-dimensional circulation route;
a drive part for circulating the endless member in a direction traveling sequentially via the first to eighth transport path portions; and
a workpiece holding tool that is transported by the endless member; and
at least a workpiece cleaning part, a workpiece rinsing part, and a workpiece drying part being included in the workpiece treatment parts.

According to the bench top cleaning device of the present invention, by guiding an endless member such as a flexible endless belt, an endless chain, etc., and circulating the endless member so that a three-dimensional circulation route provided with first to eighth transport path portions disposed along eight sides of a rectangular parallelepiped is formed, the workpiece can be transported along the three-dimensional circulation route.

By disposing transport paths along the eight sides in a rectangular parallelepiped space that can be secured on a bench top in this way, usage of the limited rectangular parallelepiped space is increased, and a long transport path length can be secured, and a plurality of workpiece treatment parts can be disposed along the transport paths.

Here, when the first, second, and eighth transport path portions are made to be an upper side horizontal transport path portion which transports the workpiece in the horizontal direction, the fourth, fifth, and sixth transport path portions are a lower side horizontal transport path portion that transports the workpiece in the horizontal direction at a position lower than the upper side horizontal transport path portion, the third transport path portion is a descending side transport path portion that transports the workpiece from the upper side horizontal transport path portion to the lower side horizontal transport path portion, and the seventh transport path portion is a rising side transport path portion that transports the workpiece from the lower side horizontal transport path portion to the upper side horizontal transport path portion.

In this case, it is possible to have each transport path portion be a linear transport path portion, but it is preferable to use an arc-shaped transport path portion to make it possible to easily guide the endless belt or endless chain. Specifically, it is preferable to have the upper side horizontal transport path portion be an arc-shaped transport path portion inscribed within the first side, the second side, and the eighth side; have the lower side horizontal transport path portion be an arc-shaped transport path portion inscribed within the fourth, fifth, and sixth sides; have the descending side transport path portion be an arc-shaped transport path portion inscribed within the second, third, and fourth sides; and have the rising side transport path portion be an arc-shaped transport path portion inscribed within the sixth, seventh, and eighth sides.

Alternatively, when the first and fifth transport path portions are each made to be an upper side horizontal transport path portion that transports the workpiece in the horizontal direction, then the third and seventh transport path portions are lower side horizontal transport path portions that transport the workpiece in the horizontal direction at a position lower than the respective upper side horizontal transport path portion, the second and sixth transport path portions are descending side transport path portions that transport the workpiece from the respective upper side horizontal transport path portion to the respective lower side horizontal transport path portion, and the fourth and eighth transport path portions are rising side transport path portions that transport the workpiece from the respective lower side horizontal transport path portion to the respective upper side horizontal transport path portion.

Next, it is possible to use a conveyor belt of a prescribed width that is bendable in two directions, the width direction and the thickness direction, as the endless member. It is possible to attach one workpiece holding tool, or a plurality of workpiece holding tools at prescribed intervals in the lengthwise direction on the conveyor belt.

Also, as the endless member, it is possible to use a flexible conveyor chain that is bendable in the direction perpendicular to the lengthwise direction. In this case as well, it is possible to attach one workpiece holding tool, or workpiece holding tools at prescribed intervals in the lengthwise direction on the conveyor chain.

Also, in this case, as the drive part of the conveyor chain, it is possible to use a drive part provided with: an upper side chain driving wheel (pulley) on which the conveyor chain part positioned at the upper side horizontal transport path portion is stretched; a lower side chain driving wheel (pulley) on which the conveyor chain part positioned at the lower side horizontal transport path portion is stretched; a descending side chain driving wheel (pulley) on which the conveyor chain part positioned at the descending side transport path portion is stretched; a rising side chain driving wheel (pulley) on which the conveyor chain part positioned at the rising side transport path portion is stretched; and a motor that synchronously rotates the upper side chain driving wheel, the lower side chain driving wheel, the descending side chain driving wheel, and the rising side chain driving wheel.

By using such a chain drive part, it is possible to circulate the conveyor chain along the three-dimensional circulation route without loosening, so it is possible to transport the workpiece with good precision.

Next, for workpiece treatment parts such as a workpiece cleaning part, a workpiece rinsing part, etc., a tank in which a liquid such as a cleaning liquid, rinsing liquid, etc., is stored is typically used. Therefore, it is preferable to dispose these treatment parts at the upper side horizontal transport path portion, the lower side horizontal transport path portion, a lower end side part of the descending side transport path portion, or a lower end side part of the rising side transport path portion. In contrast to this, it is preferable to dispose treatment parts such as a workpiece water draining part, a workpiece drying part, etc., in a midway position of the rising side transport path portion and the descending side transport path portion.

Meanwhile, as the workpiece holding tool for workpiece transport, it is possible to use an item having a structure provided with an arm member attached to the endless member, and a workpiece-holding basket suspended in a swingable state from this arm member.

For example, the endless member that defines the three-dimensional circulation route is guided so that, of the surfaces of the endless member, a first surface facing upward in the upper side horizontal transport path portion faces downward in the lower side horizontal transport path portion. In this case, the workpiece-holding basket is attached to the first surface, and the treatment tank of the workpiece treatment part is disposed, opening upward, below the lower side horizontal transport path portion. The workpiece-holding basket of the workpiece holding part attached to the endless member is transported across the lower side horizontal transport path portion in a state suspended from the downward-facing first surface. Thus, if a portion of the lower side horizontal transport path portion is set so as to be a route that is curved downward, the workpiece-holding basket transported by the endless member can be immersed in the treatment tank and be again raised up from the treatment tank as it is transported. Thus, it is possible to implement immersion cleaning on the workpiece held in the workpiece-holding basket.

MODE FOR CARRYING OUT THE INVENTION

Hereafter are described embodiments of a three-dimensional transport type bench top cleaning device to which the present invention is applied, with reference to the drawings.

Embodiment 1

Figure 1A:
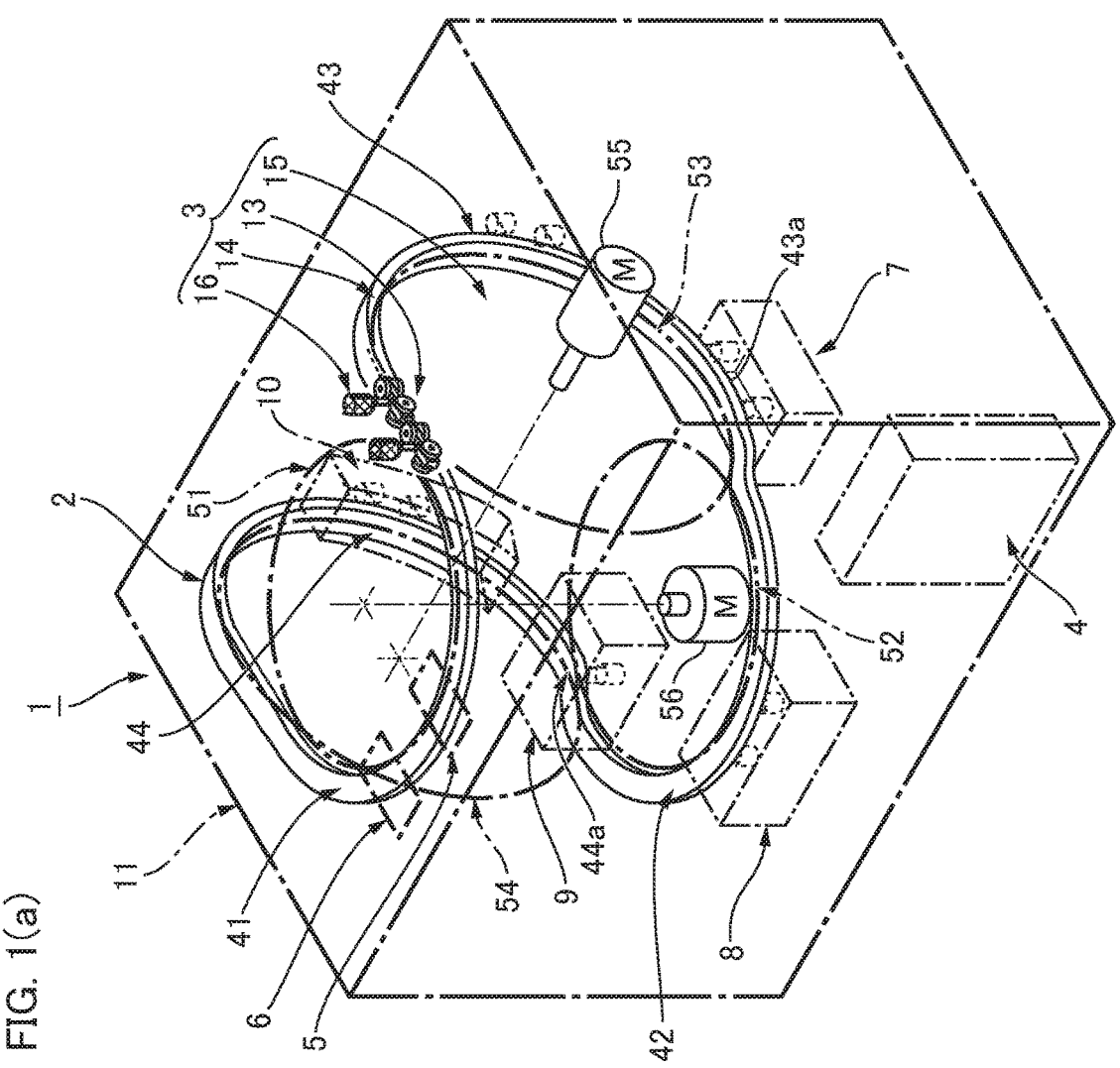
FIGS. 1(a) and 1(b) include an explanatory drawing showing a three-dimensional transport type bench top cleaning device of embodiment 1 of the present invention, and an explanatory drawing showing a three-dimensional circulation route.
Figure 1B:
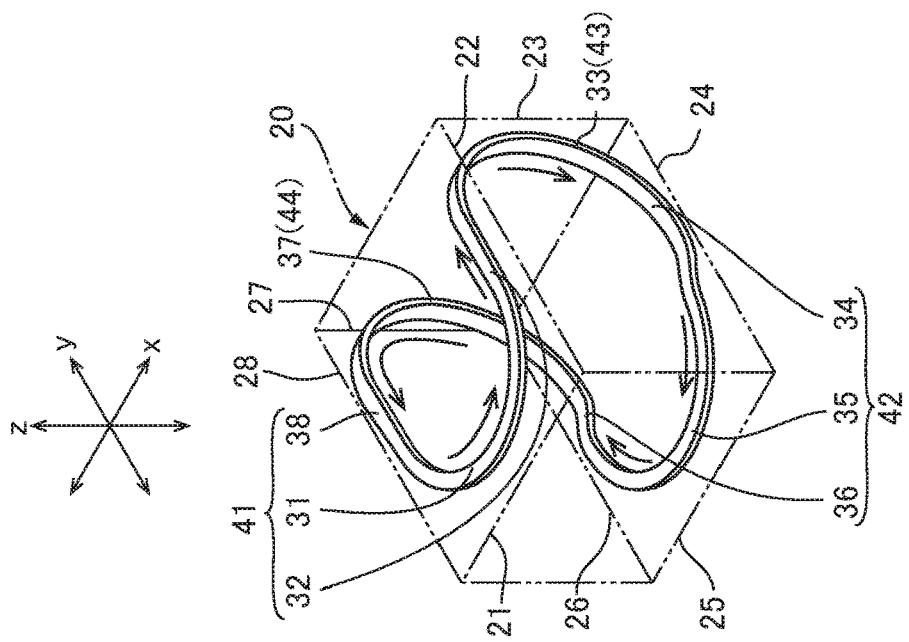

FIG. 1(a) is a schematic diagram showing the three-dimensional transport type bench top cleaning device (hereafter also sometimes called simply "cleaning device") according to embodiment 1 of the present invention, and FIG. 1(b) is an explanatory view showing a three-dimensional circulation route thereof. A cleaning device 1 according to the present embodiment is provided with a three-dimensional circulation route 2 that defines a transport route of a workpiece to be cleaned (not shown), a workpiece transport mechanism 3 that transports the workpiece along the three-dimensional circulation route 2, and a control unit 4 that controls the driving of each part.

Along the three-dimensional circulation route 2 are disposed: a workpiece input part 5 that inputs the workpiece to the three-dimensional circulation route 2; a workpiece carryout part 6 that carries out the workpiece from the three-dimensional circulation route 2; and a plurality of workpiece treatment parts disposed between the workpiece input part 5 and the workpiece carryout part 6 in the three-dimensional circulation route 2. In this example, as the workpiece treatment parts, disposed are: an ultrasonic cleaning tank 7 (workpiece cleaning part), a shower cleaning tank 8 (workpiece rinsing part), a steam cleaning tank 9 (workpiece rinsing part), and a workpiece drying part 10.

Each of the abovementioned structural parts of the cleaning device 1 is incorporated inside a device housing 11 of dimensions that can be installed in a rectangular parallelepiped space that can be secured on a bench top. For example, the device housing 11 has dimensions that can be installed inside a rectangular parallelepiped space of 1 to 2 m wide, 1 to 2 m deep, and 1 to 2 m high.

The workpiece transport mechanism 3 is provided with: a flexible endless member that defines the three-dimensional circulation route 2, and in this example, is an endless conveyor chain 13; a chain guide rail 14 that guides the conveyor chain 13; a chain drive part 15 that circulates the conveyor chain 13; and a plurality of workpiece holding tools 16 attached to the conveyor chain 13.

The three-dimensional circulation route 2 is formed as follows inside the device housing 11. As shown in FIG. 1(b), a rectangular parallelepiped space 20 of a size that can be ensured inside the device housing 11 is shown by imaginary lines, and the directions for each side of the rectangular parallelepiped space 20 are x (left-right direction), y (front-back direction), and z (top-bottom direction). The three-dimensional circulation route 2 is formed from first to eighth transport path portions 31 to 38 noted hereafter.

At the front surface side of the device, a first transport path portion 31 that extends along an upper side first side 21 extending in the x direction in the rectangular parallelepiped space 20, a second transport path portion 32 that extends along a second side 22 extending to the rear in the y direction from one end of the first side 21, a third transport path portion 33 that extends along a third side 23 extending downward in the z direction from an end of the second side 22, a fourth transport path portion 34 that extends along a fourth side 24 extending to the front in the y direction from an end of the third side 23, a fifth transport path portion 35 that extends along a fifth side 25 extending in the x direction from an end of the fourth side 24, a sixth transport path portion 36 that extends along a sixth side 26 extending to the rear in the y direction from an end of the fifth side 25, a seventh transport path portion 37 that extends along a seventh side 27 extending upward in the z direction from an end of the sixth side 26, and an eighth transport path portion 38 that extends along an eighth side 28 extending to the front in the y direction from an end of the seventh side 27

With this example, the first, second, and eighth transport path portions 31, 32, 38 are an upper side horizontal transport path portion 41 that transports the workpiece in the horizontal direction, and that upper side horizontal transport path portion 41 is an arc-shaped transport path portion inscribed within the first, second, and eighth sides 21, 22 and 28. The lower side fourth, fifth, and sixth transport path portions 34, 35, 36 are a lower side horizontal transport path portion 42 that transports the workpiece in the horizontal direction below the upper side horizontal transport path portion 41, and is an arc-shaped transport path portion inscribed within the fourth to sixth sides 24 to 26.

The third transport path portion 33 on the left side of the device is a descending side transport path portion 43 that transports the workpiece from the upper side horizontal transport path portion 41 to the lower side horizontal transport path portion 42, and the descending side transport path portion 43 is an arc-shaped transport path portion inscribed within the second, third, and fourth sides 22, 23, 24. The seventh transport path portion 37 on the right side of the device is a rising side transport path portion 44 that transports the workpiece from the lower side horizontal transport path portion 42 to the upper side horizontal transport path portion 41, and the rising side transport path portion 44 is an arc-shaped transport path portion inscribed within the sixth, seventh, and eighth sides 26 to 28.

The chain drive part 15 is provided with: an upper side horizontal chain driving wheel 51 on which the conveyor chain 13 part positioned at the upper side horizontal transport path portion 41 is stretched; a lower side horizontal chain driving wheel 52 on which the conveyor chain 13 part positioned at the lower side horizontal transport path portion 42 is stretched; a descending side vertical chain driving wheel 53 on which the conveyor chain 13 part positioned on the descending side transport path portion 43 is stretched; and a rising side vertical chain driving wheel 54 on which the conveyor chain 13 part positioned at the rising side transport path portion 44 is stretched. Also, a plurality of motors 55, 56 are provided which synchronize and rotate these chain driving wheels 51 to 54.

Figure 2:
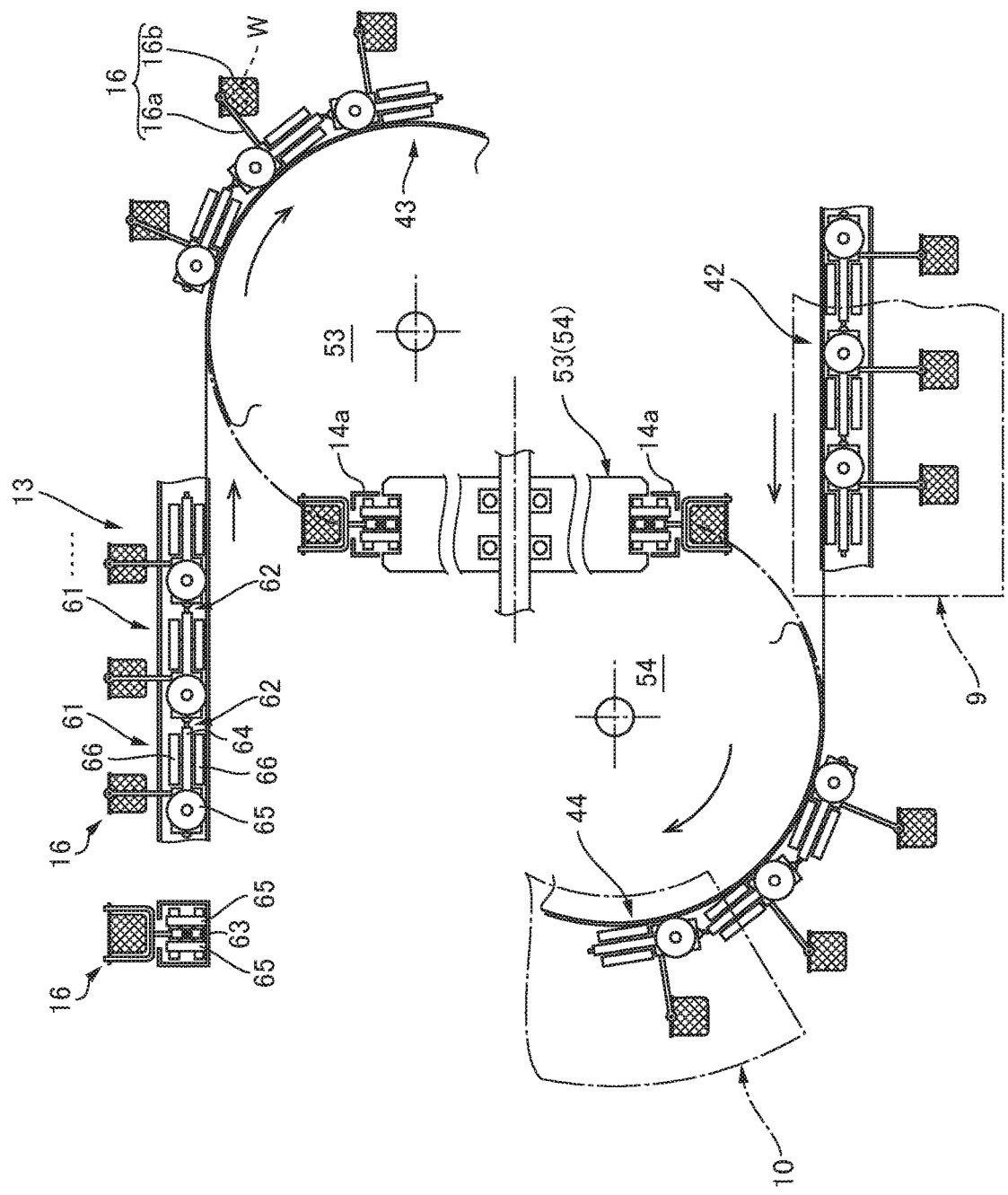
FIG. 2 is an explanatory drawing showing the structural parts of a workpiece transport mechanism of FIG. 1(a)
Figure 3:
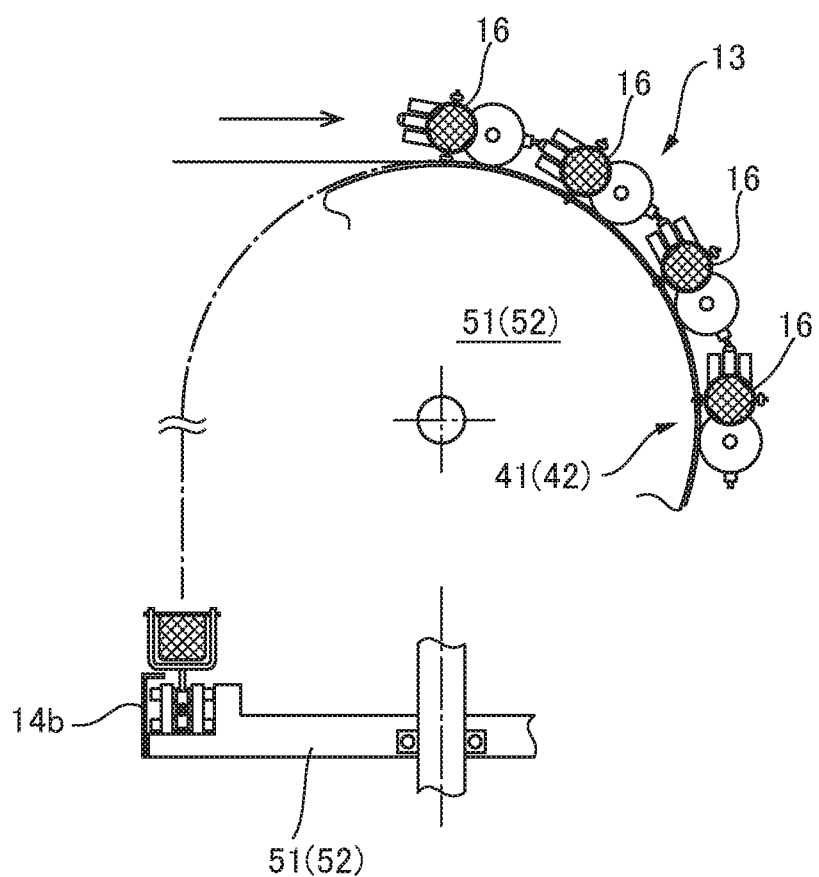
FIG. 3 is an explanatory drawing showing the structural parts of the workpiece transport mechanism of FIG. 1(a)

FIG. 2 and FIG. 3 are explanatory views showing an example of the conveyor chain 13, the chain guide rail 14, and the workpiece holding tools 16 of the workpiece transport mechanism 3. The conveyor chain 13 is a conveyor chain that can bend in the direction perpendicular to the lengthwise direction so as to be able to be guided in a state curved along the abovementioned three-dimensional circulation route 2.

The conveyor chain 13 is configured with a large number of chain modules 61 linked in a column via a pivot joint 62. Each chain module 61 is provided with a first mounting plate 63, and a second mounting plate 64 attached coaxially in an orientation perpendicular to one end of the first mounting plate 63. At both sides of the first mounting plate 63, with bearings interposed, a left-right pair of first rollers 65 are attached in a state freely rotatable around an axial line perpendicular to the first mounting plate 63. At both sides of the second mounting plate 64 as well, with bearings interposed, a left-right pair of second rollers 66 are attached in a state freely rotatable around an axial line perpendicular to the second mounting plate 64.

The workpiece holding tools 16 are attached to the chain modules 61 of the conveyor chain 13. The workpiece holding tool 16 is provided with an arm 16*a* fixed perpendicular to the first mounting plate 63 of the chain module 61; and a workpiece-holding basket 16*b* attached in a state swingable in the advancing direction of the conveyor chain 13, between the tip parts of two branches into which the arm 16*a* is divided. The workpiece-holding basket 16*b* is a basket comprising a mesh material, such as metal mesh, for example, that opens upward, and a workpiece W which is subject to cleaning is input here and transported.

For example, when the workpiece holding tool 16 that is transported along the three-dimensional circulation route 2 by the conveyor chain 13 is above the upper side horizontal transport path portion 41, as shown in the upper part of FIG. 2, the arm 16*a* is kept perpendicular. When passing through the upper half part of the descending side transport path portion 43 from the upper side horizontal transport path portion 41, as shown in the upper right part of FIG. 2, the arm 16*a* gradually tilts, but the workpiece-holding basket 16*b* suspended therefrom does not experience a change in orientation, staying oriented vertically upward under its own weight, so the workpiece W therein does not fall.

Also, as shown in the lower part of FIG. 2, in the workpiece holding tool 16 that is transported across the lower side horizontal transport path portion 42, the workpiece-holding basket 16*b* is in a state suspended downward. In a state facing the rising side transport path portion 44, as shown in the lower left part of FIG. 2, the arm 16*a* of the workpiece holding tool 16 gradually tilts, but the orientation of the workpiece-holding basket 16*b* does not change, so the basket is transported in a state suspended from the arm 16*a* while staying in an upward-facing vertical orientation. The workpiece-holding basket is not limited to being an open type basket, and a basket of a shape to match the product such as a lidded basket, a spherical basket, etc., can also be used.

Here, in the descending side transport path portion 43, and the rising side transport path portion 44, as shown in FIG. 2, the guide rail 14 that guides the conveyor chain 13 is defined by a left-right pair of rails 14*a* having an L-shaped cross section capable of holding the conveyor chain 13 between circular outer circumference end surfaces of the descending side vertical chain driving wheel 53 and the rising side vertical chain driving wheel 54.

Similarly, in the upper side horizontal transport path portion 41, and the lower side horizontal transport path portion 42, as shown in FIG. 3, the guide rail 14 is defined by a rail 14*b* having an L-shaped cross section and disposed in a state covering from the outside the conveyor chain 13 that is engaged with and transported by the circular outer circumference edge parts of the upper side horizontal chain driving wheel 51, and the lower side horizontal chain driving wheel 52.

Referring again to FIG. 1(*a*), the disposition positions of the workpiece treatment parts are explained. In this example, the workpiece input part 5 is positioned at the center of the width direction of the upper side horizontal transport path portion 41. In the workpiece input part 5, by manual operation, or by a workpiece input mechanism (not shown), the workpiece to be cleaned is input to the workpiece-holding basket 16*b* of the workpiece holding tool 16 in that position.

The ultrasonic cleaning tank 7 is disposed below the part of the lower side horizontal transport path portion 42 that is connected to the descending side transport path portion 43. In this example, this connecting part 43*a* is an arc-shaped transport route that is curved downward. The workpiece holding tool that passes through here has the workpiece-holding basket 16*b* in a state suspended downward in an upward-facing orientation. Therefore, when the workpiece-holding basket 16*b* reaches the ultrasonic cleaning tank 7 that opens upward, it gradually descends, and later gradually rises. Thus, the workpiece W that is in the workpiece-holding basket 16*b* is immersed and undergoes ultrasonic cleaning while it passes through the ultrasonic cleaning tank 7.

The shower cleaning tank 8 is disposed below the midway position in the lower side horizontal transport path portion 42. Shower cleaning is implemented on the workpiece held in the workpiece-holding basket 16*b* that is transported in a suspended state.

The part of the lower side horizontal transport path portion 42 that is linked to the rising side transport path portion 44 is an arc-shaped transport route 44*a* that is curved downward. The steam cleaning tank 9 that opens upward is disposed below this. The workpiece held in the workpiece-holding basket 16*b* that passes through here is immersed in a steam cleaning tank 9 over a prescribed time, with steam cleaning implemented during that time.

The workpiece drying part 10 is disposed at the rear side of approximately the vertical-direction middle position of the rising side transport path portion 44. The workpiece inside the workpiece-holding basket 16*b* is heated and dries while passing through here.

The workpiece carryout part 6 is disposed at a site on the upper side horizontal transport path portion 41, further to the right side of the device than the workpiece input part 5. Removal from the workpiece-holding basket 16*b* and discharging to the outside is done here. The work of removing the workpiece is performed manually or by a workpiece removal mechanism (not shown).

Various modes can be used for the workpiece treatment parts. For example, the shower cleaning part can be disposed at the descending side transport path portion 43 to perform preliminary cleaning of the workpiece. It is also possible to increase the number of cleaning tanks and rinsing tanks.

With the cleaning device 1 of this configuration, the conveyor chain 13, for example, moves intermittently along the three-dimensional circulation route 2 in a direction traveling via the upper side horizontal transport path portion 41, the descending side transport path portion 43, the lower side horizontal transport path portion 42, and the rising side transport path portion 44, and again returning to the upper side horizontal transport path portion 41. The workpiece W subject to cleaning is input to the workpiece-holding basket 16*b* of the workpiece holding tool 16 that moved to the workpiece input part 5. The workpiece W, in accordance with movement of the conveyor chain 13, reaches the workpiece carryout part 6 by traveling sequentially via the ultrasonic cleaning tank 7, the shower cleaning tank 8, the steam cleaning tank 9, and the workpiece drying part 10. At the workpiece carryout part 6, the cleaned workpiece is discharged, the now-empty workpiece holding tool 16 again reaches the workpiece input part 5, and a new workpiece to be cleaned is input. In this way, with each circuit of the three-dimensional circulation route 2, the steps of cleaning, rinsing, and drying are implemented on each workpiece held in the workpiece holding tool 6.

Embodiment 2

Figure 4A:
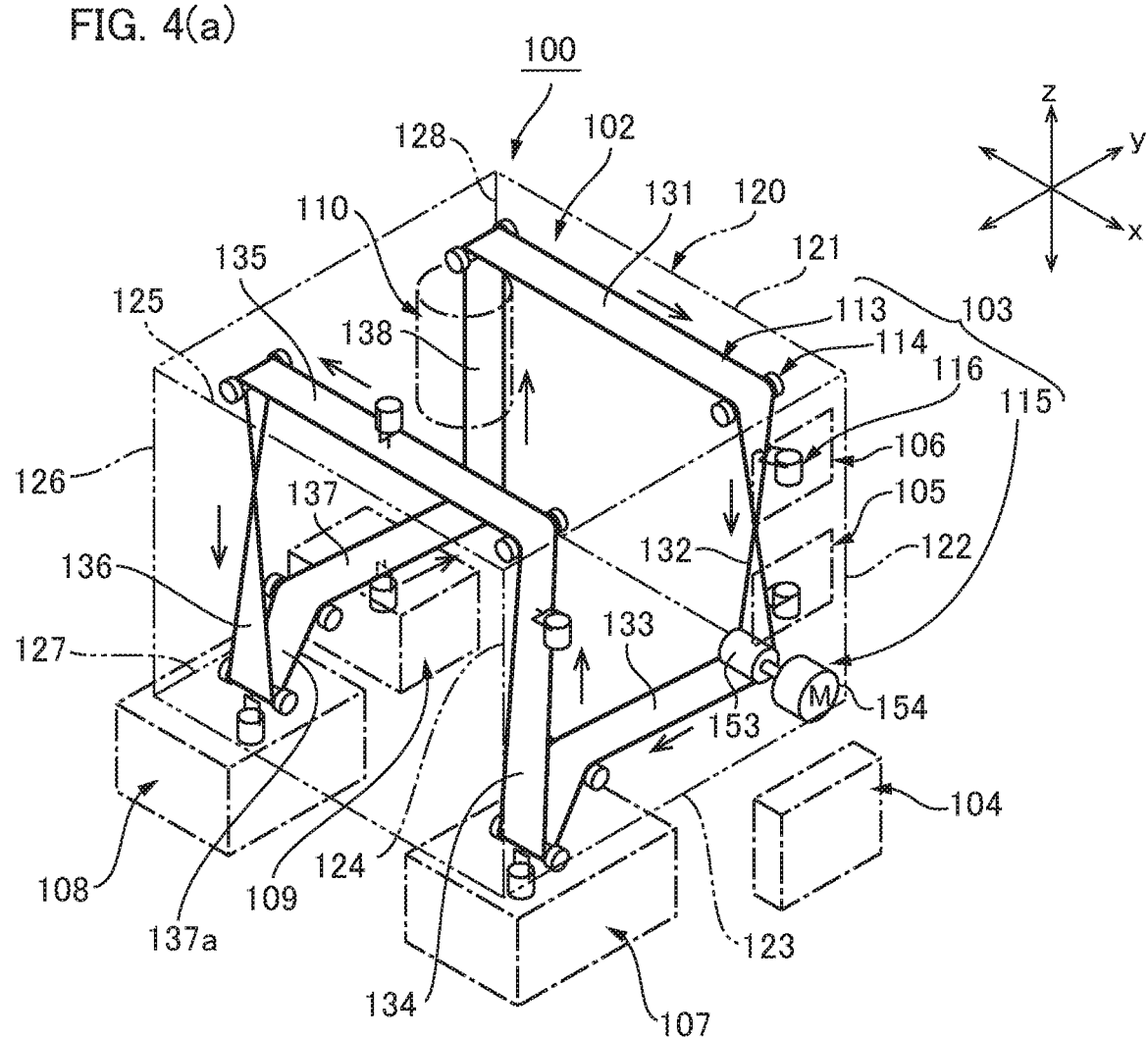
FIGS. 4(a) and 4(b) include an explanatory drawing showing a three-dimensional transport type bench top cleaning device of embodiment 2 of the present invention, and an explanatory drawing showing the workpiece holding tool.
Figure 4B:
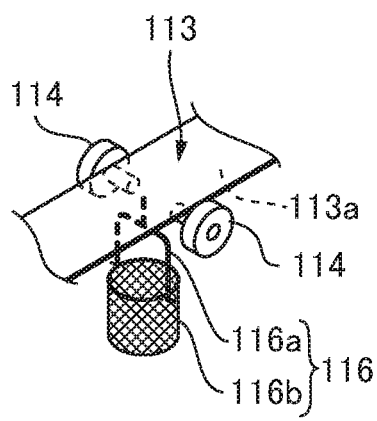

FIG. 4(*a*) is an explanatory view showing the major parts of a three-dimensional transport type bench top cleaning device according to embodiment 2, to which the present invention is applied. The basic configuration of a cleaning device 100 of the present embodiment is the same as that of embodiment 1, and provided are: a three-dimensional circulation route 102 that defines the transport route of a workpiece to be cleaned (not shown), a workpiece transport mechanism 103 that transports the workpiece along the three-dimensional circulation route 102, and a control unit 104 that controls the driving of each part. Also, along the three-dimensional circulation route 102, disposed are: a workpiece input part 105 that inputs the workpiece to the three-dimensional circulation route 102, a workpiece carry-out part 106 that carries out the workpiece from the three-dimensional circulation route 102, and a plurality of workpiece treatment parts disposed between the workpiece input part 105 and the workpiece carryout part 106 in the three-dimensional circulation route 102. For example, as the workpiece treatment parts, disposed are: an ultrasonic cleaning tank 107, a shower cleaning tank 108, a steam cleaning tank 109, and a workpiece drying part 110. Furthermore, each structural part of the cleaning device 100 is incorporated within a device housing (not shown) of dimensions that can be installed in a rectangular parallelepiped space that can be secured on a bench top.

The workpiece transport mechanism 103 is a flexible endless member that defines the three-dimensional circulation route 102, and in this example, is provided with: a fixed width flexible steel belt 113, a large number of guide rollers 114 disposed with the steel belt 113 stretched so as to delineate the three-dimensional circulation route 102, a belt drive part 115 that circulates the steel belt 113, and a plurality of workpiece holding tools 116 attached to the steel belt 113.

When the directions of each side of a rectangular parallelepiped space 120 of a size that can be secured within the device housing are set as x (left-right direction), y (front-back direction), and z (top-bottom direction), the three-dimensional circulation route 102 is formed from first to eighth transport path portions 131 to 138 noted hereafter.

At the front surface side of the device, a first transport path portion 131 that extends along an upper side first side 121 extending in the x direction in the rectangular parallelepiped space 120, a second transport path portion 132 that extends along a second side 122 extending in the z direction from one end of the first side 121, a third transport path portion 133 that extends along a third side 123 extending in the y direction from an end of the second side 122, a fourth transport path portion 134 that extends along a fourth side 124 extending in the z direction from an end of the third side 123, a fifth transport path portion 135 that extends along a fifth side 125 extending in the x direction from an end of the fourth side 124, a sixth transport path portion 136 that extends along a sixth side 126 extending in the z direction from an end of the fifth side 125, a seventh transport path portion 137 that extends along a seventh side 127 extending in the y direction from an end of the sixth side 126, and an eighth transport path portion 138 that extends along an eighth side 128 extending in the z direction from an end of the seventh side 127

In this example, the first and fifth transport path portions 131, 135 are upper side horizontal transport path portions that transport the workpiece in the horizontal direction, and the third and seventh transport path portions 133, 137 are lower side horizontal transport path portions that transport the workpiece in the horizontal direction at a position below the respective upper side horizontal transport path portion. Also, the second and sixth transport path portions 132, 136 are descending side transport path portions that transport the workpiece from the respective upper side horizontal transport path portions to the respective lower side horizontal transport path portions, and the fourth and eighth transport path portions 134, 138 are rising side transport path portions that transport the workpiece from the respective lower side horizontal transport path portions to the respective upper side horizontal transport path portions.

The steel belt 113, in the first and fifth transport path portions 131, 135, is stretched between guide rollers 114 in a state where one first surface 113*a* of the steel belt 113 is facing upward, and in the third and seventh transport path portions 133, 137, is stretched in a state where the first surface 113*a* is facing downward. Also, the second, fourth, sixth, and eighth transport path portions 132, 134, 136, 138 are stretched in a state twisted so that the orientation of the first surface 113*a* changes by 90 degrees.

The workpiece holding tools 116 are attached at fixed intervals along the lengthwise direction on the first surface 113*a* of the steel belt 113. As shown in FIG. 4(*b*), the workpiece holding tool 116 is provided with an arm 116*a* fixed perpendicular to the first surface 113*a* of the steel belt 113, and a workpiece-holding basket 116*b* suspended in a swingable state at the tip of the arm.

Also, the belt drive part 115 of the steel belt 113 is provided with drive rollers 153 on which the steel belt 113 is stretched, and a motor 154 that intermittently rotationally drives the drive rollers 153.

Next, the disposition positions of the workpiece treatment parts are explained. First, as shown in FIG. 4(*a*), the workpiece input part 105 is disposed at the lower side portion of the second transport path portion 132 that is the front side descending transport path portion. The workpiece input mechanism (not shown) is disposed here, and the workpiece to be cleaned is input in the workpiece holding tool 116 moved here. The steel belt 113 circulates in the direction in which the workpiece holding tool 116 sequentially travels via the first to eighth transport path portions 131 to 138 in that order. It moves intermittently, for example.

Figure 5:
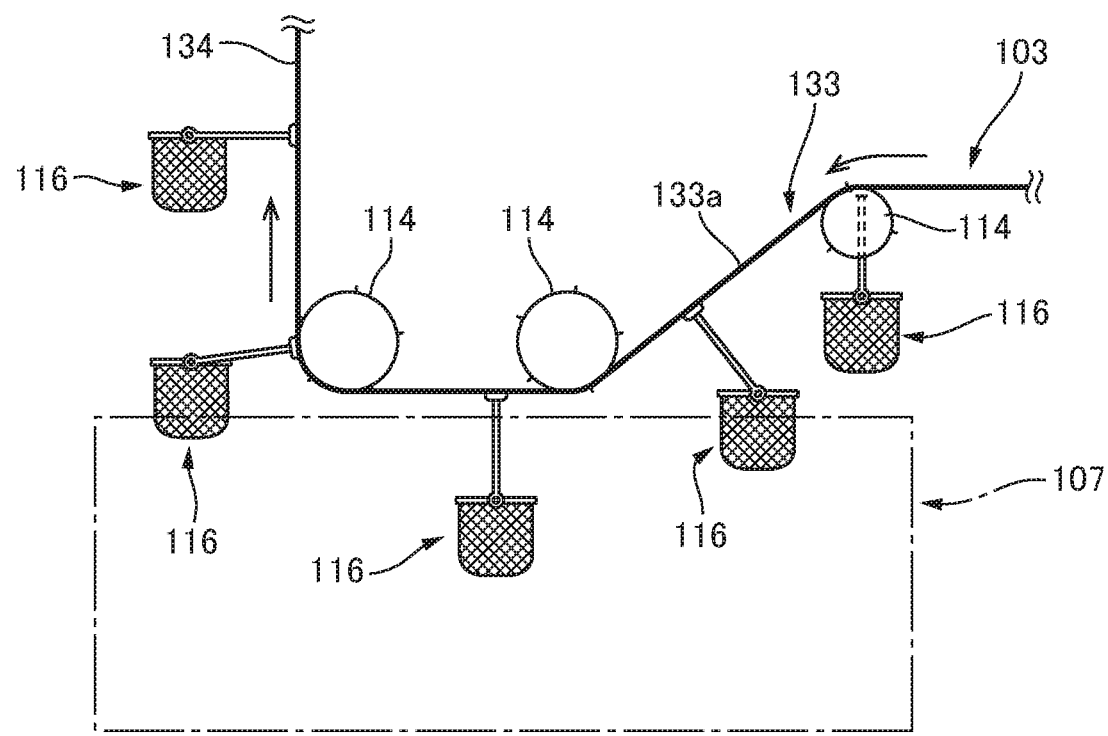
FIG. 5 is an explanatory drawing showing a portion of the three-dimensional circulation route of FIG. 4(a).

FIG. 5 is an explanatory view showing the part of the three-dimensional circulation route 102 where the ultrasonic cleaning tank 107 is disposed. Explaining with reference to FIG. 4(*a*) and FIG. 5, the ultrasonic cleaning tank 107 is disposed below the rear end side part of the third transport path portion 133, which is the lower side horizontal transport path portion on the right side. A rear end side part 133*a* of the third transport path portion 133, after being bent downward, becomes the route that moves to the fourth transport path portion 134. Therefore, the workpiece held in the workpiece holding tool 116 that passes through here is transported in a state immersed in the ultrasonic cleaning tank 107, and ultrasonic cleaning is implemented.

The workpiece holding tool 116 after implementation of ultrasonic cleaning rises along the fourth transport path portion 134, which is the rising transport path portion on the left side. In this rising process, the liquid draining operation of cleaning liquid adhered to the workpiece held in the workpiece-holding basket 116*b* of the workpiece holding tool 116 is performed efficiently.

Again, explaining with reference to FIG. 4(*a*), the shower cleaning tank 108 of the next stage is disposed below the rear end side part of the seventh transport path portion 137, which is the lower side horizontal transport path portion on the right side. A rear end side part 137*a* of this seventh transport path portion 137 is the transport path portion tilted upward from the bottom end of the sixth transport path portion 136. Therefore, while being moved from the bottom end of the sixth transport path portion 136 to the seventh transport path portion 137, the workpiece holding tool 116 is immersed in the shower cleaning tank 108, and shower cleaning is implemented on the workpiece.

The steam cleaning tank 109 is disposed at the part approximately in the middle in the device front-back direction in the seventh transport path portion 137, and steam cleaning is implemented on the workpiece of the workpiece holding tool 116 that passes through here.

The workpiece drying part 110 is disposed in the midway position of the eighth transport path portion 138 that is the rising transport path portion subsequent to the seventh transport path portion 137. The workpiece of the workpiece holding tool 116 rising along the eighth transport path portion 138 moves while liquid draining is being performed, and enters the workpiece drying part 110 to be dried. The workpiece holding tool 116 after drying travels via the first transport path portion 131 and returns to the second transport path portion 132. The workpiece carryout part 106 is disposed at a position above the workpiece input part 105 on the second transport path portion 132. Here, the workpiece after cleaning is removed from the workpiece holding tool 116 by a workpiece carryout mechanism (not shown). A new workpiece to be cleaned is input to the now-empty workpiece holding tool 116 at the workpiece input part 105.

Other Embodiments

With the embodiments noted above, the three-dimensional circulation route is defined using the flexible conveyor chain and the steel belt. The three-dimensional circulation route can be defined using a flexible endless member other than these, such as a wire member such as wire, rope, etc., for example, and the workpiece holding tools can be attached to these.

Also, as the workpiece holding tool, instead of the workpiece-holding basket comprising mesh material, for example, it is also possible to use a workpiece placement platform attached to the surface of the conveyor belt so as to be detachable, and to place the workpiece directly on that workpiece placement platform.

Furthermore, as the workpiece treatment parts, it is possible to dispose the workpiece cleaning part and the workpiece rinsing part according to various types of workpiece cleaning methods, and to use various drying modes for the workpiece drying part as well, and these are not limited to the embodiments noted above.

SYMBOLS

1 Cleaning device
2 Three-dimensional circulation route
3 Workpiece transport mechanism
4 Control unit
5 workpiece input part
6 workpiece carryout part
7 Ultrasonic cleaning tank
8 Shower cleaning tank
9 Steam cleaning tank
10 workpiece drying part
11 device housing
13 Conveyor chain
14 Guide rail
15 Chain drive part
16 Workpiece holding tool
16*a* Arm
16*b* Workpiece holding basket
20 Rectangular parallelepiped space
21 to 28 First to eighth sides
31 to 38 First to eighth transport path portions
41 Upper side horizontal transport path portion
42 Lower side horizontal transport path portion
43 Descending side transport path portion
44 Rising side transport path portion
51 Upper side horizontal chain drive wheel
52 Lower side horizontal chain drive wheel
53 Descending side vertical chain drive wheel
54 Rising side vertical chain drive wheel
55, 56 Motors
61 Chain module
62 Pivot joint
63 First mounting plate
64 Second mounting plate
65 First roller
66 Second roller
100 Cleaning device
102 Three-dimensional transport route
103 workpiece transport mechanism
104 Control unit
105 Workpiece input part
106 Workpiece carryout part
107 Ultrasonic cleaning tank
108 Shower cleaning tank
109 Steam cleaning tank
110 Workpiece drying part
113 Steel belt
113*a* First surface
114 Guide roller
116 Workpiece holding tool
116*a* Arm
116*b* Workpiece holding basket
120 Rectangular parallelepiped space
121 to 128 First to eighth sides
131 to 138 First to eighth transport path portions
153 Drive roller
154 Motor

The invention claimed is:
1. A three-dimensional transport type bench top cleaning device comprising:
a three-dimensional circulation route that defines a transport route of a workpiece to be cleaned;
a workpiece transport mechanism that transports the workpiece along the three-dimensional circulation route;
a workpiece input part that inputs the workpiece to the three-dimensional circulation route;
a workpiece carryout part that carries out the workpiece from the three-dimensional circulation route; and a plurality of workpiece treatment parts disposed at different positions between the workpiece input part and the workpiece carryout part in the three-dimensional circulation route, the three-dimensional circulation route being provided with at least:

a first unique transport path portion that extends in a first plane within the three dimensional space;

a second unique transport path portion that extends in a second plane within the three dimensional space;

a third unique transport path portion that extend in a third plane within the three dimensional space;

wherein the first, second and third planes are orthogonal with respect to each other;

the workpiece transport mechanism being provided with:

a flexible endless member that defines the three-dimensional circulation route;

a drive part for circulating the endless member in a direction traveling sequentially via the first to third transport path portions; and a workpiece holding tool that is transported by the endless member; and at least a workpiece cleaning part, a workpiece rinsing part, and a workpiece drying part being included in the workpiece treatment parts.

2. The three-dimensional transport type bench top cleaning device according to claim 1, wherein:

the first transport path portion extends along a first side extending in an x direction of a rectangular parallelepiped;

the second transport path portion extends along a second side extending in a y direction of the rectangular parallelepiped from one end of the first side;

the third transport path portion extends along a third side extending in a z direction of the rectangular parallelepiped from an end of the second side; and the x, y, and z directions are orthogonal to each other.

3. The three-dimensional transport type bench top cleaning device according to claim 2, further comprising:

a fourth transport path portion that extends along a fourth side extending in the y direction from an end of the third side;

a fifth transport path portion that extends along a fifth side extending in the x direction from an end of the fourth side;

a sixth transport path portion that extends along a sixth side extending in the y direction from an end of the fifth side;

a seventh transport path portion that extends along a seventh side extending in the z direction from an end of the sixth side; and an eighth transport path portion that extends along an eighth side extending in the y direction from an end of the seventh side.

4. The three-dimensional transport type bench top cleaning device according to claim 3, wherein, the first, second, and eighth transport path portions are an upper side horizontal transport path portion that transports the workpiece within a horizontal plane;

the fourth, fifth, and sixth transport path portions are a lower side horizontal transport path portion that transports the workpiece within a horizontal plane at a position lower than the upper side horizontal transport path portion;

the third transport path portion is a descending side transport path portion that transports the workpiece from the upper side horizontal transport path portion to the lower side horizontal transport path portion; and the seventh transport path portion is a rising side transport path portion that transports the workpiece from the lower side horizontal transport path portion to the upper side horizontal transport path portion.

5. The three-dimensional transport type bench top cleaning device according to claim 4, wherein the upper side horizontal transport path portion is an arc-shaped transport path portion inscribed within the first side, the second side, and the eighth side;

the lower side horizontal transport path portion is an arc-shaped transport path portion inscribed within the fourth, fifth, and sixth sides;

the descending side transport path portion is an arc-shaped transport path portion inscribed within the second, third, and fourth sides; and the rising side transport path portion is an arc-shaped transport path portion inscribed within the sixth, seventh, and eighth sides.

6. The three-dimensional transport type bench top cleaning device according to claim 4, wherein the endless member is a flexible conveyor chain that is bendable in a direction perpendicular to a lengthwise direction thereof, and one workpiece holding tool, or workpiece holding tools at prescribed intervals in the lengthwise direction on the conveyor chain.

7. The three-dimensional transport type bench top cleaning device according to claim 6, wherein the drive part comprises:

an upper side chain driving wheel on which a conveyor chain part positioned at the upper side horizontal transport path portion is stretched;

a lower side chain driving wheel on which a conveyor chain part positioned at the lower side horizontal transport path portion is stretched;

a descending side chain driving wheel on which a conveyor chain part positioned at the descending side transport path portion is stretched;

a rising side chain driving wheel on which a conveyor chain part positioned at the rising side transport path portion is stretched; and a motor that synchronously rotates the upper side chain driving wheel, the lower side chain driving wheel, the descending side chain driving wheel, and the rising side chain driving wheel.

8. The three-dimensional transport type bench top cleaning device according to claim 4, wherein the workpiece cleaning part and the workpiece rinsing part are disposed at one or both of the upper side horizontal transport path portion and the lower side horizontal transport path portion; and the workpiece drying part is disposed at the rising side transport path portion or the descending side transport path portion.

9. The three-dimensional transport type bench top cleaning device according to claim 4, wherein the workpiece holding tool comprises: an arm member attached to the endless member, and a workpiece-holding basket suspended in a swingable state from the arm member.

10. The three-dimensional transport type bench top cleaning device according to claim 1, wherein:

the first transport path portion extends along one first side extending in an x direction of a rectangular parallelepiped;

the second transport path portion extends along a second side extending in a z direction of the rectangular parallelepiped from one end of the first side;

the third transport path portion extends along a third side extending in a y direction of the rectangular parallelepiped from an end of the second side; and where the x, y, and z directions are orthogonal to each other.

11. The three-dimensional transport type bench top cleaning device according to claim 10, further comprising:

a fourth transport path portion that extends along a fourth side extending in the z direction from an end of the third side;

a fifth transport path portion that extends along a fifth side extending in the x direction from an end of the fourth side;

a sixth transport path portion that extends along a sixth side extending in the z direction from an end of the fifth side;

a seventh transport path portion that extends along a seventh side extending in the y direction from an end of the sixth side; and an eighth transport path portion that extends along an eighth side extending in the z direction from an end of the seventh side.

12. The three-dimensional transport type bench top cleaning device according to claim 11, wherein the first and fifth transport path portions are upper side horizontal transport path portions that transport the workpiece within a horizontal plane;

the third and seventh transport path portions are lower side horizontal transport path portions that transport the workpiece within a horizontal plane at a position lower than the respective upper side horizontal transport path portions;

the second and sixth transport path portions are descending side transport path portions that transport the workpiece from the respective upper side horizontal transport path portions to the respective lower side horizontal transport path portions; and the fourth and eighth transport path portions are rising side transport path portions that transport the workpiece from the respective lower side horizontal transport path portions to the respective upper side horizontal transport path portions.

* * * * *